US012713135B2

(12) United States Patent
Tanaka

(10) Patent No.: US 12,713,135 B2
(45) Date of Patent: Aug. 18, 2026

(54) CONTROL DEVICE, CONTROL METHOD, AND NON-TRANSITORY COMPUTER READABLE MEDIUM

(71) Applicant: CANON KABUSHIKI KAISHA, Tokyo (JP)

(72) Inventor: Ryo Tanaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 19/072,843

(22) Filed: Mar. 6, 2025

(65) Prior Publication Data

US 2025/0287105 A1 Sep. 11, 2025

(30) Foreign Application Priority Data

Mar. 11, 2024 (JP) ................................ 2024-037019

(51) Int. Cl.
*H04N 23/695* (2023.01)

(52) U.S. Cl.
CPC ................................ *H04N 23/695* (2023.01)

(58) Field of Classification Search
CPC . H04N 21/42222; H04N 23/68; H04N 23/695
See application file for complete search history.

(56) References Cited

U.S. PATENT DOCUMENTS 5,398,117 A * 3/1995 Suzuki .................. H04N 1/393 382/298
7,227,294 B2 * 6/2007 Mazz .................. H04N 9/3129 310/317
12,177,566 B2 * 12/2024 Idaka .................. H04N 23/695
12,587,749 B2 * 3/2026 Idaka .................. H04N 23/695
2004/0263681 A1 * 12/2004 Teramoto ........... G08B 13/1963 348/E7.087
2005/0046910 A1 * 3/2005 Hashizume .......... H04N 1/0414 358/474
2023/0345125 A1 * 10/2023 Idaka .................. H04N 23/695
2025/0287104 A1 * 9/2025 Osawa ................ H04N 23/695

FOREIGN PATENT DOCUMENTS

JP 3726826 B2 12/2005

* cited by examiner

*Primary Examiner* — Chiawei Chen
(74) *Attorney, Agent, or Firm* — Canon U.S.A., Inc. IP Division

(57) ABSTRACT

A control device includes a calculating unit that calculates a panning control velocity and a tilting control velocity to cause, to be identical, driving time for driving a panning driving unit to a panning target position and driving time for driving a tilting driving unit to a tilting target position. If at least one of the calculated panning control velocity or the calculated tilting control velocity is included in a range of a specified velocity specified based on mechanical resonance of an image capturing unit, the calculating unit corrects the panning control velocity and the tilting control velocity to cause, to be identical, the driving time for driving the panning driving unit to the panning target position and the driving time for driving the tilting driving unit to the tilting target position.

9 Claims, 11 Drawing Sheets

100
101
IMAGE CAPTURING UNIT
102
IMAGE PROCESSING UNIT
103
SYSTEM CONTROL UNIT
104
LENS DRIVING UNIT
105
LENS CONTROL UNIT
106
PANNING DRIVING UNIT
107
PANNING CONTROL UNIT
108
TILTING DRIVING UNIT
109
TILTING CONTROL UNIT
110
COMMUNICATION INTERFACE UNIT
300
200
201
USER INTERFACE UNIT
202
CPU
203
ROM
204
RAM
205
DISPLAY UNIT
206

| COMMAND IDENTIFIER (2101) | REGISTER/DELETE (2102) | PRESET NUMBER (2103) |
|---|---|---|
| 0100 | REGISTER | 3 |

| COMMAND IDENTIFIER (2201) | START/STOP (2202) | PRESET NUMBER (2203) | VELOCITY (2204) |
|---|---|---|---|
| 0200 | START | 3 | 5 |

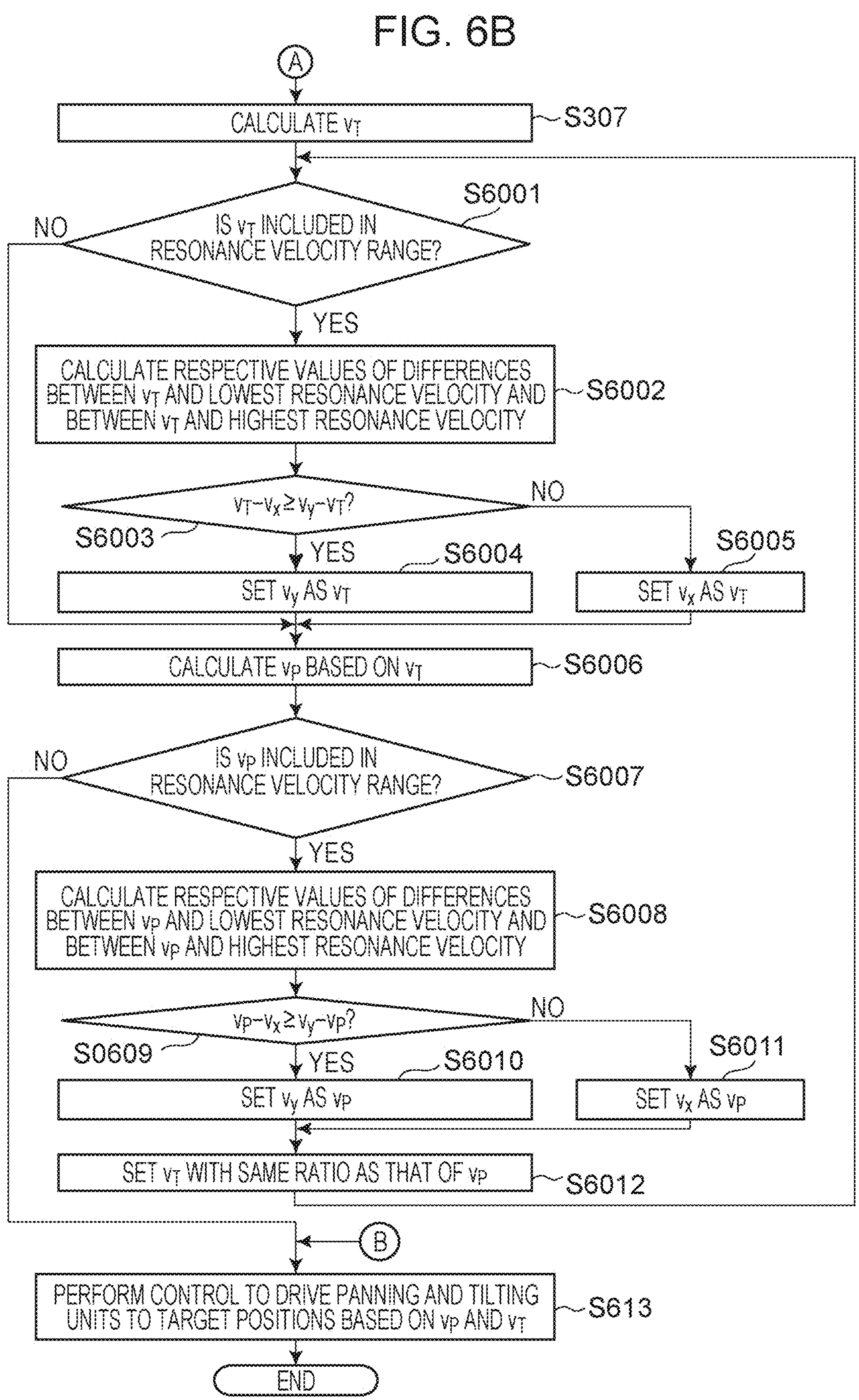
FIG. 6B
A
CALCULATE $v_T$
S307
IS $v_T$ INCLUDED IN RESONANCE VELOCITY RANGE?
S6001
NO
YES
CALCULATE RESPECTIVE VALUES OF DIFFERENCES BETWEEN $v_T$ AND LOWEST RESONANCE VELOCITY AND BETWEEN $v_T$ AND HIGHEST RESONANCE VELOCITY
S6002
$v_T - v_x \geq v_y - v_T$?
S6003
NO
YES
S6004
S6005
SET $v_y$ AS $v_T$
SET $v_x$ AS $v_T$
CALCULATE $v_P$ BASED ON $v_T$
S6006
IS $v_P$ INCLUDED IN RESONANCE VELOCITY RANGE?
S6007
NO
YES
CALCULATE RESPECTIVE VALUES OF DIFFERENCES BETWEEN $v_P$ AND LOWEST RESONANCE VELOCITY AND BETWEEN $v_P$ AND HIGHEST RESONANCE VELOCITY
S6008
$v_P - v_x \geq v_y - v_P$?
S0609
NO
YES
S6010
S6011
SET $v_y$ AS $v_P$
SET $v_x$ AS $v_P$
SET $v_T$ WITH SAME RATIO AS THAT OF $v_P$
S6012
B
PERFORM CONTROL TO DRIVE PANNING AND TILTING UNITS TO TARGET POSITIONS BASED ON $v_P$ AND $v_T$
S613
END

FIG. 7A

CONTROL DEVICE, CONTROL METHOD, AND NON-TRANSITORY COMPUTER READABLE MEDIUM

BACKGROUND

Field of the Disclosure

The present disclosure relates to control technology for a camera capable of panning and tilting control.

Description of the Related Art

In recent years, systems that perform control of panning and tilting driving units of a camera capable of controlling the panning and tilting driving units are widely used in the field of video production. In the systems, shooting actions are performed with the image capturing direction of the camera being changed. Some of the cameras calculate a panning control velocity and a tilting control velocity and perform control of the control velocities to cause the panning and tilting driving units to reach target positions simultaneously in driving the panning and tilting driving units to the target positions.

However, in performing control to drive the panning and tilting driving units at predetermined control velocities in the camera capable of controlling the panning and tilting driving units, the mechanical characteristics of the panning and tilting driving units cause vibration due to resonance on occasions, (hereinafter, a predetermined velocity leading to the occurrence of the resonance is referred to as a resonance velocity). At this time, in calculating the control velocities to cause the panning and tilting driving units to simultaneously reach the target positions, if the control velocities are included in the respective resonance velocity ranges, vibration due to resonance occur on occasions.

Japanese Patent No. 3726826 discloses a resonance prevention method by which if one of the driving amounts of the panning and tilting driving units is small, and if the control velocity is within the resonance range, the control velocity is set outside the resonance range.

However, one of the control velocities of panning and tilting is set outside the resonance range in the related art disclosed in the Japanese Patent No. 3726826 above, and thus it is not possible to perform control to cause the panning and tilting driving units to simultaneously reach the target positions.

SUMMARY

The present disclosure provides a control device that causes panning and tilting driving units to simultaneously reach target positions while preventing resonance.

To achieve the above, a control device according to an aspect of the present disclosure has the following configuration. A control device includes: a calculating unit that calculates a panning control velocity and a tilting control velocity to cause, to be identical, driving time for driving a panning driving unit to a panning target position and driving time for driving a tilting driving unit to a tilting target position; and a control unit that performs control to drive the panning driving unit at the panning control velocity and that performs control to drive the tilting driving unit at the tilting control velocity. If at least one of the calculated panning control velocity or the calculated tilting control velocity is included in a range of a specified velocity specified based on mechanical resonance of an image capturing unit, the calculating unit corrects the panning control velocity and the tilting control velocity to cause, to be identical, the driving time for driving the panning driving unit to the panning target position and the driving time for driving the tilting driving unit to the tilting target position.

Further features of the present disclosure will become apparent from the following description of exemplary embodiments with reference to the attached drawings.

BRIEF DESCRIPTION OF THE DRAWINGS

FIG. 3A illustrates a control command indicating the registration of a preset position according to one or more aspects of the present disclosure, and FIG. 3B illustrates a control command indicating a preset move operation according to one or more aspects of the present disclosure.

FIGS. 6A and 6B are flowcharts illustrating a control velocity calculation process according to one or more aspects of the present disclosure in the preset move operation.

FIG. 7A is a flowchart illustrating a control velocity calculation process according to one or more aspects of the present disclosure in the preset move operation.

DESCRIPTION OF THE EMBODIMENTS

Figure 1:
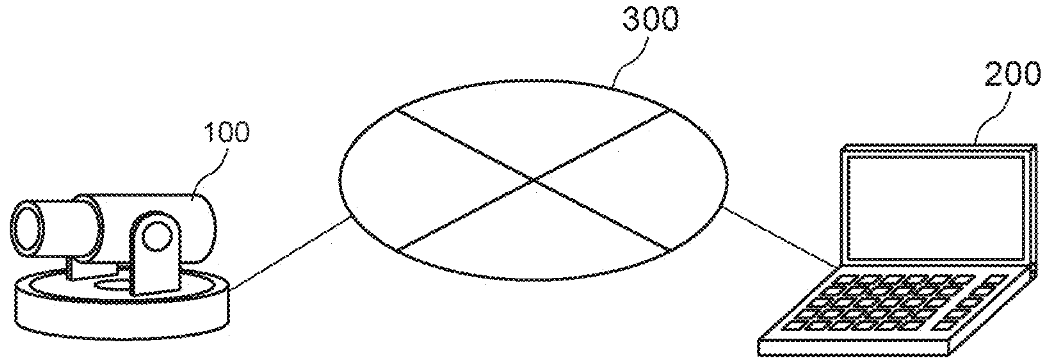
FIG. 1 is a view of a system configuration according to one or more aspects of the present disclosure.

Hereinafter, embodiments will be described in detail with reference to the attached drawings. Note that the following embodiments are not intended to limit the scope of the claims. A plurality of features are described in the embodiments, but limitation is not made to an embodiment that requires all such features, and the plurality of such features may be combined optionally. Furthermore, in the attached drawings, the same or similar components are denoted by the same reference numerals, and repeated description thereof is omitted.

First Embodiment

FIG. 1 is a view of a system configuration according to a first embodiment. The image capturing system in this embodiment has an imaging device 100, an external apparatus 200, and a network 300. A method for connecting devices is not limited to a specific method. The connection may be made by using, for example, a wired cable. The imaging device 100 receives the command from the external apparatus 200 via the network 300 and transmits a response from a system control unit 103 (described later) to the external apparatus 200 via the network 300. The imaging device 100 has a panning driving unit 106 (described later) and a tilting driving unit 108 and is capable of changing an image capturing direction by driving at least one of the panning driving unit 106 or the tilting driving unit 108. The imaging device 100 according to this embodiment is also capable of driving the panning driving unit 106 and the tilting driving unit 108, respectively, to the panning target position and the tilting target position that are set with the external apparatus 200. In addition, a driving source such as a motor for driving a panning driving unit or a tilting driving unit typically produces noise or vibration due to resonance with the body of an imaging device 100 on occasions, depending on a specific driving frequency. That is, driving at such a velocity that corresponding to the specific driving frequency leading to mechanical resonance causes the resonance in some cases. To prevent such resonance, the imaging device 100 according to this embodiment holds a parameter (resonance velocity parameter) for a specified velocity (a resonance velocity) specified based on the velocity leading to the resonance. Further, the control velocities are calculated based on the resonance velocity parameter held by the imaging device 100 to cause each of the panning driving unit 106 and the tilting driving unit 108 to simultaneously reach the target positions.

Explanation of Device and Apparatus

Figure 2:
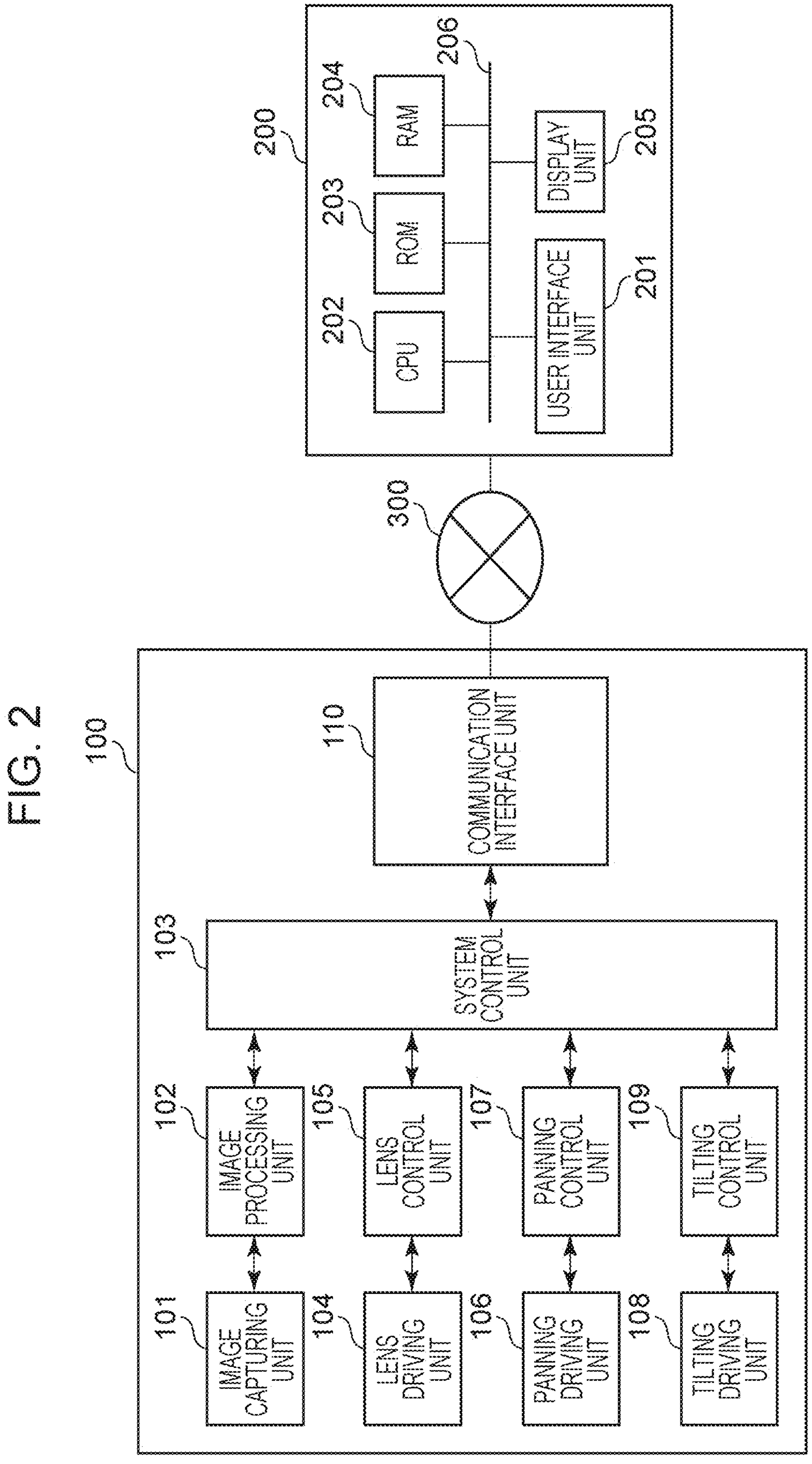
FIG. 2 is a block diagram of a configuration according to one or more aspects of the present disclosure.

An example configuration of the imaging device 100 and the external apparatus 200 according to this embodiment will then be described by using FIG. 2. The configuration illustrated in FIG. 2 is merely an example of a configuration with which this embodiment is implementable and is not limited to the configuration illustrated in FIG. 2. In addition, the configuration illustrated in FIG. 2 merely illustrates a main configuration for implementing operations of the imaging device 100 (described below) and omits the illustration of not a main configuration in the following description, such as a configuration related to a power supply system and a configuration related to recording and delivery of captured video. As a concrete example, processing performed by at least part of components may be implemented by hardware incorporated in the imaging device 100.

As the hardware, for example, a dedicated circuit (ASIC) and a processor (DSP) are applicable.

As illustrated in FIG. 2, the imaging device 100 has an image capturing unit 101, an image processing unit 102, the system control unit 103, a lens driving unit 104, a lens control unit 105, the panning driving unit 106, a panning control unit 107, the tilting driving unit 108, a tilting control unit 109, and a communication interface unit 110. In this embodiment, the imaging device 100 and the external apparatus 200 are separate devices but are not limited to this. For example, an imaging device having a user interface unit 201 (described later) is also usable. In this case, a control command input with the user interface unit 201 is output to the system control unit 103.

The image capturing unit 101 is provided to convert light outside the imaging device 100 into a video signal through photoelectric conversion, and the video signal is output to the image processing unit 102 at the subsequent stage. For example, a CMOS image sensor may be used as an image sensor for the photoelectric conversion. A CCD image sensor may also be used as the image sensor.

The image processing unit 102 is a circuit for generating captured video by performing various known processings on the video signal output from the image capturing unit 101. For example, the image processing unit 102 digitizes the video signal acquired from the image capturing unit 101 and converts the video signal into captured video data reproducible by a different device. To enable the image processing unit 102 to convert the video signal into the video data, video data in known various formats such as high efficiency video coding (HEVC) may be adopted. The image processing unit 102 may also encode the captured video appropriately. Examples of the image processing performed by the image processing unit 102 on the digital image signal include offset processing, gamma correction processing, gain processing, RGB interpolation processing, noise reduction processing, and tone correction processing.

The system control unit 103 has a processor (for example, a CPU or a DSP) and a memory (for example, RAM), and the processor performs operation control of the components included in the imaging device 100 by performing processing by using a computer program and data stored in the memory. As the result, the system control unit 103 executes or controls processes (described later) to be executed by the imaging device 100. For example, the system control unit 103 issues an instruction to adjust an image quality to the image processing unit 102 and zoom in and focus control instructions to the lens control unit 105. The system control unit 103 also issues instructions to perform panning operation and tilting operation respectively to the panning control unit 107 and the tilting control unit 109. The system control unit 103 also includes a nonvolatile memory and uses for registering a preset position (described later).

In this embodiment, the system control unit 103 acquires control velocity parameters and target positions set by a user in the external apparatus 200 via the communication interface unit 110. The system control unit 103 also calculates control velocities from the target positions and the control velocity parameters. A concrete method for calculating a control velocity will be described later. In this embodiment, a control velocity parameter denotes a parameter set by the user in the external apparatus 200 and includes information regarding the control velocity. For example, the control velocity parameter is an upper-limit velocity, a lower-limit velocity, a control velocity designated by the user, or a set value of the control velocity that is used in a case of controlling the panning driving unit 106 at the predetermined velocity. The control velocity is also a control velocity in the case of driving the panning driving unit 106 to the panning target position or driving the tilting driving unit 108 to the tilting target position. The system control unit 103 drives the panning driving unit 106 and the tilting driving unit 108 at the respective control velocities and performs control to cause the panning driving unit 106 and the tilting driving unit 108 to simultaneously reach the target positions.

The lens driving unit 104 includes a system for driving a focus lens and a zooming lens, a motor serving as a driving source thereof, and other components. For example, the lens driving unit 104 has a lens mechanism for optical zooming and an actuator such as a stepping motor. The operation control of the lens driving unit 104 is performed by the lens control unit 105.

The lens control unit 105 is connected to the system control unit 103 and performs the operation control of the lens driving unit 104 in accordance with an instruction from the system control unit 103.

The panning driving unit 106 includes a mechanical driving system for performing the panning operation of the imaging device 100, a motor serving as a driving source, and other components and is capable of, for example, rotating an image capturing direction (the optical axis of the image capturing lens) by 360 degrees in the pan direction. The panning driving unit 106 includes a mechanism for performing the panning operation, an actuator such as a stepping motor, and an encoder that detects a panning position. The operation control of the panning driving unit 106 is performed by the panning control unit 107. In this embodiment, the description is provided on the assumption that the panning driving unit 106 is capable of rotating the image capturing direction by 360 degrees in the pan direction; however, an angle rotatable in the pan direction is not limited to this. For example, the rotation may be performed endlessly.

The panning control unit 107 is connected to the system control unit 103 and performs the operation control of the panning driving unit 106 in accordance with an instruction from the system control unit 103. The panning control unit 107 also acquires information regarding the driving position of the panning driving unit 106 from the panning driving unit 106 and outputs the information to the system control unit 103.

The tilting driving unit 108 includes a mechanical driving system for performing the tilting operation of the imaging device 100, a motor serving as a driving source, and other components and is capable of, for example, rotating the image capturing direction (the optical axis of the image capturing lens) up to by 180 degrees in the tilt direction perpendicular to the pan direction. The tilting driving unit 108 includes a mechanical unit that performs the tilting operation, an actuator such as a stepping motor, and an encoder that detects a tilting position. The operation control of the tilting driving unit 108 is performed by the tilting control unit 109. In this embodiment, the description is provided on the assumption that the tilting driving unit 108 capable of rotating the image capturing direction from −45 degrees downward diagonally in the forward direction up to +90 degrees upward with respect to the horizontal direction as zero degrees; an angle rotatable in the tilt direction is not limited to this. For example, the rotation may be performed endlessly.

The tilting control unit 109 is connected to the system control unit 103 and performs the operation control of the tilting driving unit 108 in accordance with an instruction from the system control unit 103. The tilting control unit 109 also acquires information regarding the tilting driving position from the tilting driving unit 108 and outputs the information to the system control unit 103.

The communication interface unit 110 performs data communication with the external apparatus 200. For example, the communication interface unit 110 transmits captured video generated by the image processing unit 102 to the external apparatus 200. Further, for example, the communication interface unit 110 receives the settings for the panning and tilting operations transmitted from the external apparatus 200, settings data such as the panning and tilting control velocities, and setting parameters.

The external apparatus 200 has the user interface unit 201, a CPU 202, a ROM 203, a RAM 204, a display unit 205, and an internal bus 206 enabling mutual communication.

The user interface unit 201 is a mouse, a keyboard, or the like for receiving operation from the user and outputting the received result to the CPU 202. The user interface unit 201 receives operation from the user, and an instruction indicated by the operation is converted into a control command by the CPU 202.

The CPU 202 performs overall control of the external apparatus 200 by controlling the components of the external apparatus 200. Further, the CPU 202 transmits a control command related to the imaging device 100 to the imaging device 100 via the network 300 the control command. The CPU 202 also performs overall control of the external apparatus 200 based on a response related to the external apparatus 200 and acquired from the imaging device 100 via the network 300. For example, if captured image is acquired from the imaging device 100, the CPU 202 performs control to display the captured image on the display unit 205.

The ROM 203 is used as not only a permanent storage area for the OS, various programs, and the various pieces of data but also a short-time storage area for various pieces of data.

The RAM 204 is a high speed nonvolatile storage device represented by a DRAM or the like, and the OS, various programs, and various pieces of data are loaded therein. The RAM 204 is also used as a work area for the OS and the various programs.

The display unit 205 is a display such as a LCD for displaying a captured image acquired from the imaging device 100, various settings, and others. The display unit 205 performs displaying of the captured video transmitted from the imaging device 100 on the screen, a screen for settings required for the panning and tilting control, and buttons for performing the panning and tilting control, and the like.

The imaging device 100 of this embodiment registers preset positions in such a manner as to associate each position of a corresponding one of the lens driving unit 104, the panning driving unit 106, and the tilting driving unit 108 with a preset number; however, the preset position registration is not limited to this. For example, a preset position may be registered in such a manner that at least one of the position of the lens driving unit 104, the position of the panning driving unit 106, or the position of the tilting driving unit 108 is associated with a preset number. A preset position may also be registered by using a zoom-in value, a panning value, and a tilting value obtained by converting the position of the optical lens of the lens driving unit 104, the panning driving unit 106, and the position of the tilting driving unit 108 to predetermined values. Further, not only the positions of the panning, tilting, and lens driving units but also an image quality setting or the like may be included in performing the preset registration.

In this embodiment, the user may call a preset position associated with a preset number registered for a predetermined command. In addition, moving to a designated preset position (a preset move operation) may be performed in such a manner that a plurality of preset positions are registered for a plurality of respective preset numbers and that the user designates a preset number. The preset move operation in this embodiment is implemented by moving from the positions of the lens driving unit, the panning driving unit, and the tilting driving unit at a time point when a command designating the preset move operation is acquired to a preset position registered for the designated preset number at the specified control velocity.

In the preset move operation in this embodiment, the user is able to set information regarding a velocity for a path with the external apparatus 200. That is, the imaging device 100 in this embodiment may move to a preset position based on information regarding the order and the velocity. Further, the preset move operation is started in response to acquiring a control command indicating the start of the preset move operation and is continued passing through preset positions until a control command indicating the stopping thereof in accordance with the set order.

Control Command Related to Target Position Registration and Deletion

Processing for registering a target position in the preset move operation will be described. A control command 2100 in FIG. 3A is a control command indicating an instruction to register or delete a preset position in this embodiment. A command identifier 2101 is an identifier that identifies a control command of various control commands, and the value "0100" thereof indicates an instruction to register or delete presetting. A parameter 2102 is a parameter indicating the registration of presetting or the deletion of presetting, and designates a value indicating the registration or deletion. A parameter 2103 is a parameter indicating a preset number. For example, preset numbers of 20 positions can be registered, and one or more of the preset numbers are designated. The control command is an example, and the identifier and the parameter are not limited to these.

The user registers a preset position with a user interface 201 of the external apparatus 200. In response to the user selecting a button representing the registration or the deletion of presetting displayed on the display unit 205, the CPU 202 transmits, to the imaging device 100, a control command indicating the registration of deletion of the presetting.

As in FIG. 3A, if the system control unit 103 acquires the control command 2100, and if the preset registration is designated with the parameter 2102, the current panning, tilting, lens positions are registered for a preset number 3 serving as a preset number designated with the parameter 2103.

If the preset deletion is designated with the parameter 2102, panning, tilting, and lens positions already registered for the preset number designated with the parameter 2103 are deleted.

Control Command Related to Preset Move Operation

FIG. 3B illustrates a control command 2200 indicating an instruction to start or stop a preset move operation.

The value "0200" of a command identifier 2201 represents an instruction to start or stop a preset move operation. A parameter 2202 is a parameter indicating the start of a preset move operation or the stopping of a preset move operation and is used to designate a value representing the start of moving or the stopping of moving. A parameter 2203 is a parameter indicating a preset number and is used to designate a preset number for the start of moving or the stopping of moving. A parameter 2204 is a parameter indicating a velocity value, the system control unit 103 calculates a control velocity based on the velocity value designated with the parameter 2204.

As in FIG. 3B, a case where the system control unit 103 acquires the control command 2200 and the start of a preset move operation is designated with the parameter 2202 will be described. At this time, control of the lens driving unit 104, the panning driving unit 106, and the tilting driving unit 108 is performed to move from the current panning, tilting, and lens positions to the panning, tilting, and lens positions with the preset number "3" designated with the parameter 2203. That is, the system control unit 103 sets the panning position, the tilting position, and the lens position with the preset number "3" as a panning target position, a tilting target position, and a lens target position, respectively, and performs control to drive the lens driving unit 104, the panning driving unit 106, and the tilting driving unit 108 from the current panning, tilting, lens positions to the corresponding target positions. At this time, the system control unit 103 also calculates the control velocity based on the parameter designated with the parameter 2204 (control velocity parameter). A concrete calculation method will be described later.

If the stopping of a preset move operation is designated with the parameter 2202, a preset move operation being moving (working) is stopped. After stopping, the preset move operation is further stopped at panning, tilting, and lens stop positions; however, the stopping is not limited to this. For example, moving may be performed at a position set in advance, that is, the home position or the initial position. In this embodiment, the description is provided on the assumption that the control command 2200 designates the command identifier 2201, the parameter 2202, and the parameter 2203; however, the designation is not limited to this. If the stopping of the preset move operation is designated with the parameter 2202, the preset number and the velocity value do not have to be designated for the parameter 2203 and the parameter 2204, respectively. If the stopping of the preset move operation is designated with the parameter 2202, a system control unit 103 does not have to read the parameter 2203.

Figure 4A:
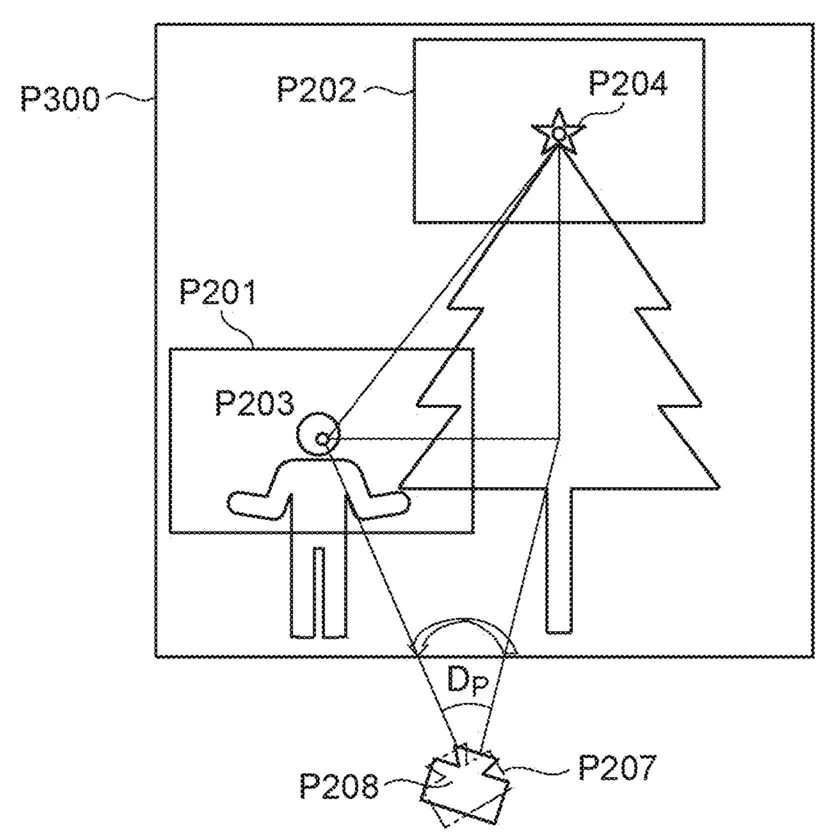
FIG. 4A is a view of an image of an imaging device according to one or more aspects of the present disclosure that is driven in a pan direction.
Figure 4B:
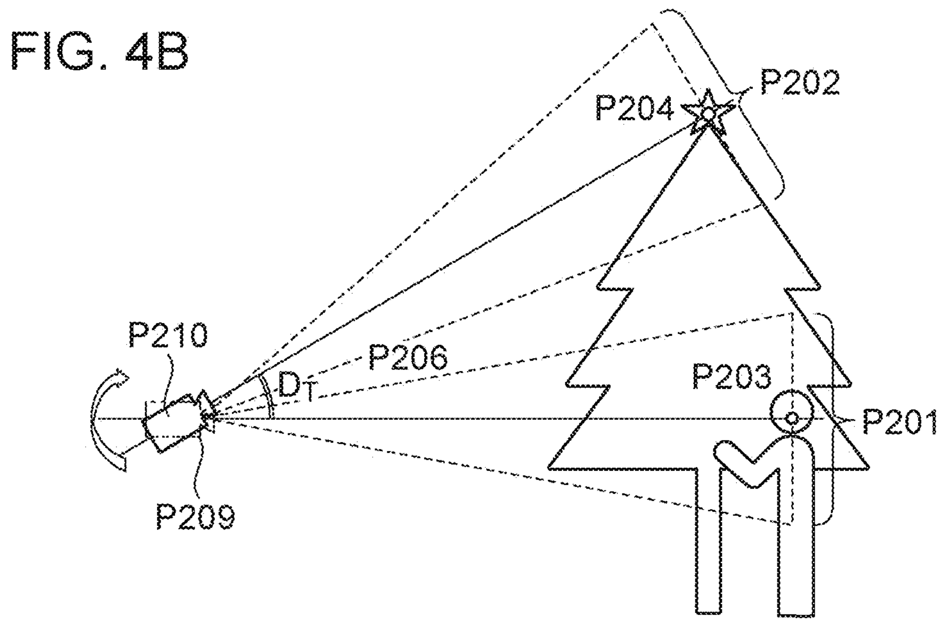
FIG. 4B is a view of an image of the imaging device driven in a tilt direction.

The motion of the panning driving unit 106 and the tilting driving unit 108 in the preset move operation will be described by using FIGS. 4A and 4B. FIG. 4A is a view of an image of the imaging device 100 according to the first embodiment that is driven in a pan direction, and FIG. 4B is a view of an image of the imaging device 100 driven in a tilt direction. P300 illustrates, from the front, an actual environment in which the imaging device 100 captures an image. P201 denotes a first view angle of image capturing at the time when the imaging device 100 is at a panning position P207 and a tilting position P209, and P202 denotes a second view angle of image capturing at the time when the panning driving unit 106 is at a panning position P208 and a tilting position P210. P203 is the center of the first view angle, and P204 is the center of the second view angle. $P_2O_5$ is a driving angle (a panning driving angle $D_P$) in the pan direction after driving from the first view angle to the second view angle, and P206 is a driving angle (a tilting driving angle $D_T$) in the tilt direction after driving from the first view angle to the second view angle. The panning driving unit 106 changes the image capturing direction by performing driving from the panning position P207 to the panning position P208 by the panning driving angle $D_P$ (degrees). The tilting driving unit 108 changes the image capturing direction by performing driving from the tilting position P209 to the tilting position 210 by the tilting driving angle $D_T$ (degrees).

In response to acquiring the control command 2100 indicating the registration of a preset position from the external apparatus 200, the system control unit 103 registers the current panning and tilting positions for a preset number designated with a preset number 2103. For example, in response to acquiring the control command 2100 when the system control unit 103 is at the panning position P208 and the tilting position P210, the system control unit 103 registers the panning position P208 and the tilting position P210 for the preset number "3". In response to acquiring the control command 2200, the system control unit 103 starts the preset move operation from the current position to a position designated with the preset number. In response to acquiring the control command 2200 when the system control unit 103 is at the panning position P207 and the tilting position P209, the system control unit 103 starts the preset move operation to the panning position P208 and the tilting position P210 that are registered for the preset number "3".

Basic Control Velocity Calculation Process

The system control unit 103 also calculates a panning control velocity $v_P$ and a tilting control velocity $v_T$ to match the panning driving time for driving the panning driving unit 106 in the pan direction by the panning driving angle $D_P$ with the tilting driving time for driving the tilting driving unit 108 in the tilt direction by the tilting driving angle $D_T$.

Hereinafter, a control velocity calculation process in starting a preset move operation will be described.

Figure 5:
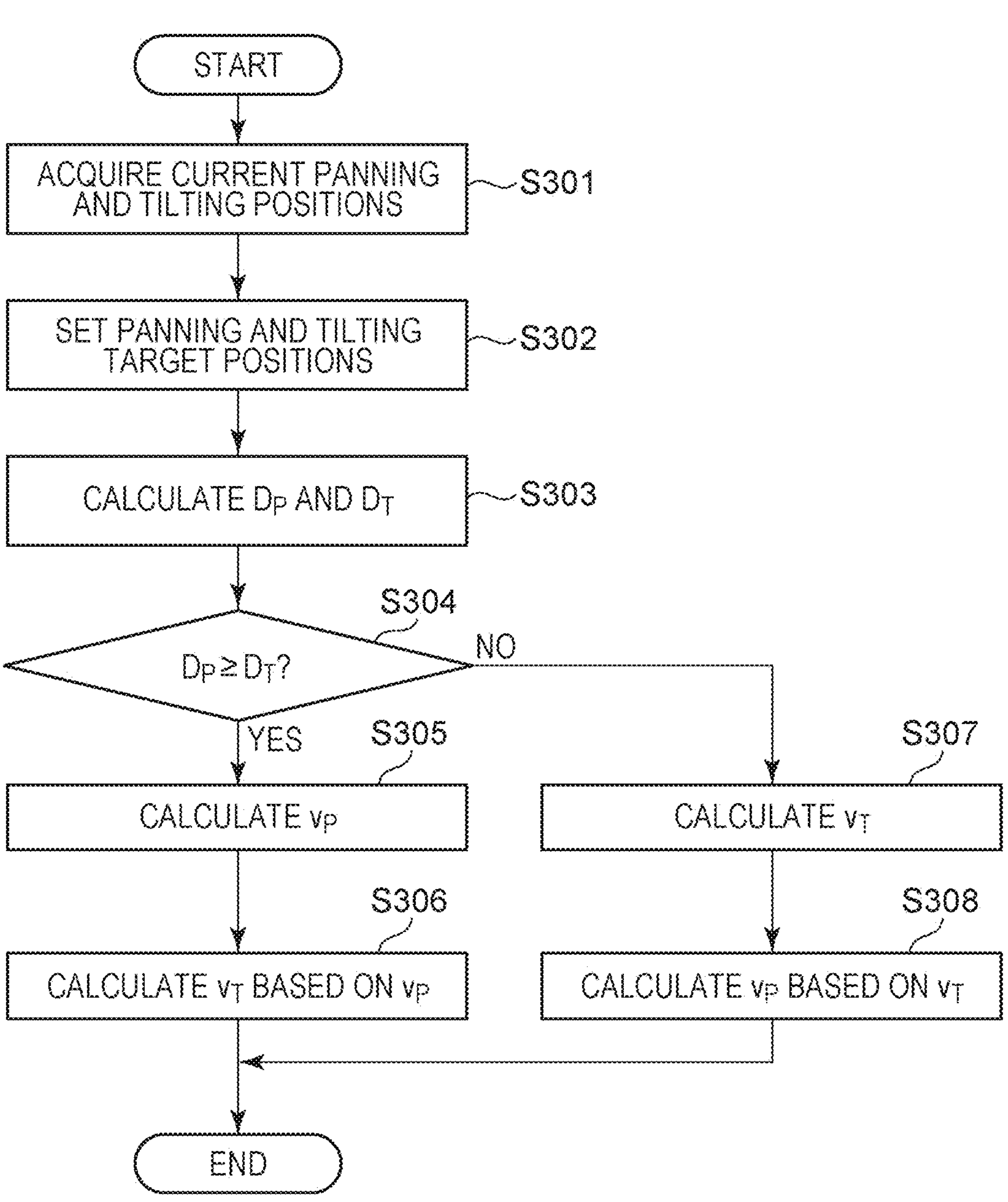
FIG. 5 is a flowchart illustrating a basic control velocity calculation process in the preset move operation.

In this flowchart, the OS, various programs, and various pieces of data are loaded into a RAM (storage device) that temporarily stores computer programs to be run by the system control unit 103, and the system control unit 103 executes this process. Steps in the flowchart in FIG. 5 are performed for the system control unit 103 to perform the preset move operation based on the control command 2200 indicating the preset move operation after receiving the control command 2200 from the external apparatus 200 via the communication interface. A screen for setting a control velocity parameter for the panning and tilting control velocities is displayed on the display unit 205, and the user sets the control velocity parameter with the user interface unit 201. The control velocity parameter for the panning and tilting control velocities thus set is transmitted to the communication interface unit 110.

In step S301, the system control unit 103 acquires the current position of the panning driving unit 106 from the panning control unit 107 and the current position of the tilting driving unit 108 from the tilting control unit 109. As described above, the panning control unit 107 and the tilting control unit 109 acquire the current positions from the encoders of the panning driving unit 106 and the tilting driving unit 108 and outputs the current positions to the system control unit 103. Further, the system control unit 103 acquires a preset number and a control velocity parameter from the external apparatus 200.

In step S302, the system control unit 103 sets, as target positions, the panning position and the tilting position with the preset number held by the system control unit 103, based on the preset number acquired in step S301 and transits to step S303.

In step S303, the system control unit 103 calculates the panning driving angle $D_P$ and the tilting driving angle $D_T$ based on the current positions of the panning driving unit 106 and the tilting driving unit 108 acquired in step S301 and the target positions of the panning driving unit 106 and the tilting driving unit 108 that are set in step S302. For example, if the current position of the panning driving unit 106 is 10 degrees, and if the target position is 150 degrees, the panning driving angle $D_P$ is calculated as below.

$$150-10=140 \text{ degrees}$$

The system control unit 103 likewise calculates the tilting driving angle $D_T$ of the tilting driving unit 108 and thereafter transits to step S304.

In step S304, the system control unit 103 determines whether the panning driving angle $D_P$ calculated in step S303 is larger than or equal to the tilting driving angle $D_T$. If the system control unit 103 determines that the panning driving angle $D_P$ is larger than or equal to the tilting driving angle $D_T$, the system control unit 103 transits to step S305. If the system control unit 103 determines that the panning driving angle $D_P$ is lower than the tilting driving angle $D_T$, the system control unit 103 transits to step S307.

In step S305, the system control unit 103 calculates the panning control velocity $v_P$ based on the control velocity parameter 2204 acquired in step S301 and the panning driving angle $D_P$ calculated in step S302. The external apparatus 200 of this embodiment designates a control velocity for the preset move operation of the driving units of the imaging device 100 from among ten levels and transmits the control velocity as a control velocity parameter into the imaging device 100. The imaging device 100 is able to calculate the control velocity based on the driving angle by converting the acquired control velocity parameter 2204 to the control velocity. In this embodiment, a method for converting the control velocity parameter into the control velocity is based on a predetermined formula in the description; however, the conversion method is not limited to this. For example, the conversion may be performed based on the control velocity table held by the system control unit 103.

The system control unit 103 calculates the panning control velocity $v_P$ based on the control velocity parameter 2204 the panning driving angle $D_P$ and transits to step S305. The control flow from step S301 to step S305 is referred to as Flow A. Specifically, if the control velocity parameter acquired from the user via the user interface unit 201 is 5, the panning control velocity $v_P$ is calculated as below.

$$v_P=A-B\times(C-5)(A,B, \text{ and } C \text{ are constants})$$

In step S306, the tilting control velocity $v_T$ based on the panning control velocity $v_P$ calculated in step S305, the panning driving angle $D_P$ and the tilting driving angle $D_T$ that are calculated in step S303 and terminates this control flow. The system control unit 103 calculates the tilting control velocity $v_T$ to match the panning driving time for driving the panning driving unit 106 in the pan direction by the panning driving angle $D_P$ with the tilting driving time for driving the tilting driving unit 108 in the tilt direction by the tilting driving angle $D_T$.

Driving time T can be expressed as below where the driving time is T, a driving angle is D, and a control velocity is v.

$$T=\frac{D}{v} \qquad \text{[Math 1]}$$

The tilting control velocity $v_T$ causing the panning driving time to match the tilting driving time is thus calculated from the following formula.

$$v_T=\frac{D_T}{D_P}v_P \qquad \text{[Math 2]}$$

In step S307, the system control unit 103 calculates the tilting control velocity $v_T$ based on the control velocity parameter 2204 acquired in step S301 and the tilting driving angle $D_T$ calculated in step S303 and transits to step S308. Since a concrete calculation method is the same as step S305, description thereof is omitted. The control flow from step S301 to step S307 is referred to as Flow B.

In step S308, the system control unit 103 calculates the panning control velocity $v_P$ based on the tilting control velocity $v_T$ calculated in step S307 and the tilting driving angle $D_T$ and the panning driving angle $D_P$ that are calculated in step S303 and terminates this control flow. Since a concrete calculation method is the same as step S306, description thereof is omitted.

As described above, the control velocity may be calculated based on the target positions and the control velocity parameter set by the user in this control flow to cause the panning driving unit 106 and the tilting driving unit 108 to simultaneously reach the target positions.

Control Velocity Calculation Flow to Prevent Resonance

If one of the panning control velocity $v_P$ and the tilting control velocity $v_T$ that are calculated is included in a range of a resonance velocity (resonance range), vibration due to resonance occurs. Hereinafter, a calculation process in which the panning control velocity $v_P$ and the tilting control velocity $v_T$ are calculated to prevent the resonance and also to match the panning driving time for driving at the panning driving angle $D_P$ with the tilting driving time for driving at the tilting driving angle $D_T$ will be described by using flowcharts in FIGS. 5, 6A, and 6B.

In this embodiment, the range of the resonance velocity is stored as the resonance velocity parameter by the system control unit 103. Further, the range of the resonance velocity in the pan direction and the range of the resonance velocity in the tilt direction are held as respective different parameters. The range of the resonance velocity in each of the pan direction and the tilt direction is not limited to one range, and the range of the resonance velocity is not set on occasions. In this embodiment, the resonance velocity range that is a range of a velocity leading to resonance is expressed as a continuous velocity range from $v_x$ degrees/see to $v_y$ degrees/sec in the description but is not limited to this. For example, if the resonance velocity is incontinuous, the value of the resonance velocity may be held as the resonance velocity parameter.

TABLE 1

| | Lowest resonance velocity parameter $v_x$ (degrees/sec) | Highest resonance velocity parameter $v_y$ (degrees/sec) |
|---|---|---|
| Panning resonance velocity range 1 | 0.1 | 0.15 |
| Panning resonance velocity range 2 | 0.5 | 0.6 |
| Tilting resonance velocity range 1 | 0.3 | 0.35 |

Resonance Velocity Parameter

As illustrated in Table 1, each resonance velocity parameter is expressed as a continuous velocity range from a lowest resonance velocity $v_x$ degrees/sec to a highest resonance velocity $v_y$ degrees/sec. The panning resonance velocity range 1 is set in the range from 0.1 (degrees/sec) to 0.15 (degrees/sec). If a control velocity is included in the range from 0.1 (degrees/sec) to 0.15 (degrees/sec), it is determined that the control velocity is included in the resonance velocity range. In the resonance velocity range in this embodiment, velocities that do not cause a resonance phenomenon to be reflected on the disturbance of video are set as the highest resonance velocity and the lowest resonance velocity; however, the resonance velocity range is not limited to this. For example, a resonance velocity leading to the maximum vibration due to resonance may be set as the reference, and a range with respect to the reference velocity may be set as the resonance velocity range.

In this embodiment, the system control unit 103 determines whether one of the control velocities calculated based on the control velocity parameter is included in any of the ranges of the resonance velocities indicated with the resonance velocity parameters. Further, if the system control unit 103 determines that the control velocity is included in the range of the resonance velocity, the system control unit 103 corrects the control velocity based on the corresponding resonance velocity parameter. The system control unit 103 also performs the control velocity calculation process based on the control velocity after the correction for driving time matching. Performing the processing described above enables the resonance to be prevented and the control velocity causing the simultaneous arrival at the target positions to be calculated.

Figure 6A:
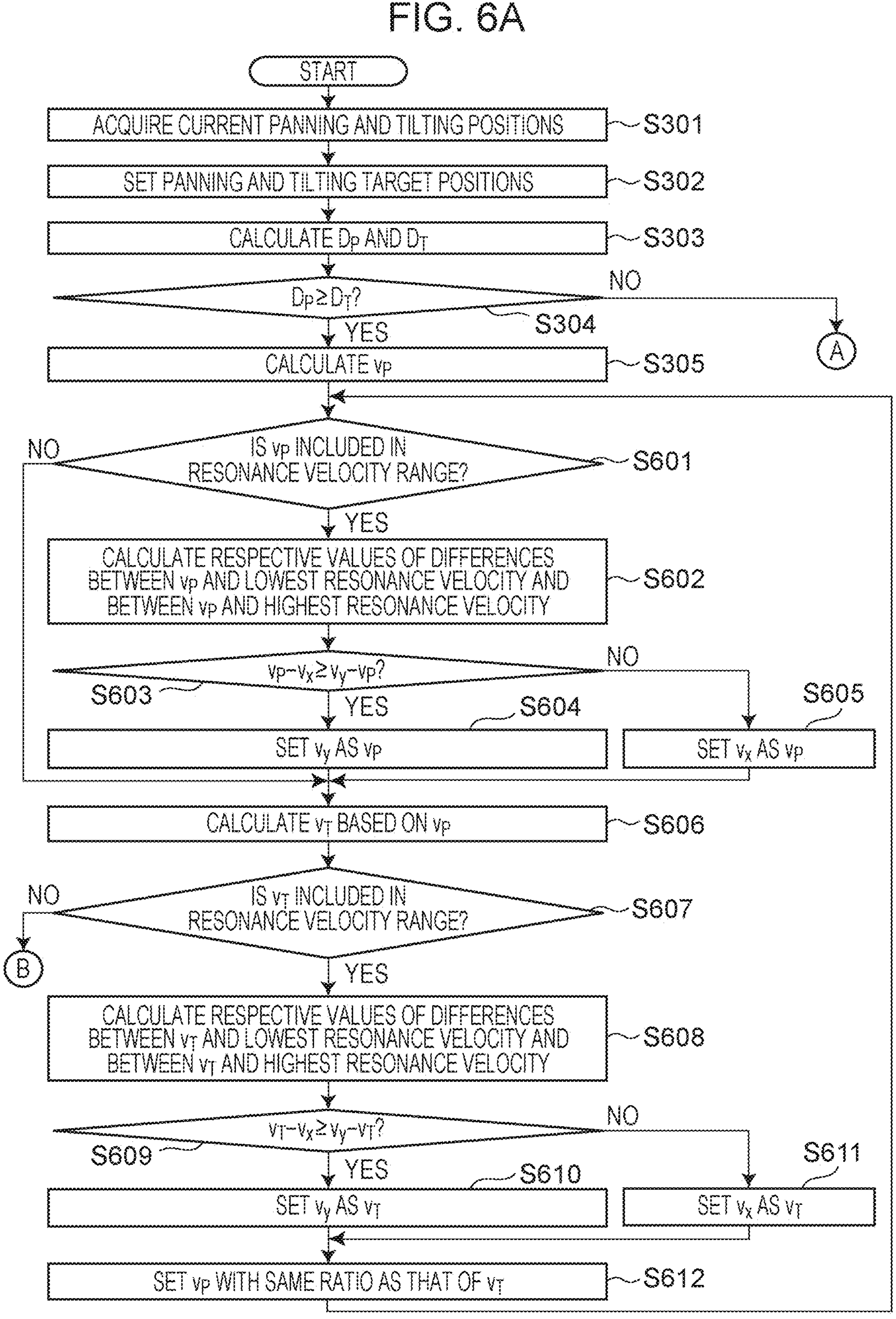

FIGS. 6A and 6B will be described specifically.

Since steps S301 to step S305 and step S307 are the same as those in the processing illustrated in FIG. 5, description thereof is omitted.

In step S601, the system control unit 103 refers to resonance velocity parameters for the ranges of the resonance velocities (resonance ranges) held by the system control unit 103 and determines whether the panning control velocity $v_P$ is included in any of the range of the resonance velocities (resonance ranges). If the system control unit 103 determines that the panning control velocity $v_P$ is included in any of the ranges of the resonance velocities (resonance ranges), the system control unit 103 transits to step S602. If the system control unit 103 does not determine that the panning control velocity $v_P$ is included in any of the ranges of the resonance velocities, the system control unit 103 transits to step S606.

In step S602, the system control unit 103 calculates a value ($v_P$–$v_x$) of a difference between the lowest velocity (lowest resonance velocity $v_x$) in the range of the resonance velocity and the panning control velocity $v_P$ and a value ($v_y$–$v_P$) of a difference between the highest velocity (highest resonance velocity $v_y$) in the range of the resonance velocity and the panning control velocity $v_P$ and transits to step S603.

In step S603, the system control unit 103 determines whether the value ($v_P$–$v_x$) of the difference between the lowest velocity (lowest resonance velocity $v_x$) in the range of the resonance velocity and the panning control velocity $v_P$ is higher than or equal to the value of the difference between the highest velocity (highest resonance velocity $v_y$) in the range of the resonance velocity and the panning control velocity $v_P$, based on the following formula.

$$v_P - v_x \geq v_y - v_P \quad \text{[Math 3]}$$

If the system control unit 103 determines that the value of the difference between the lowest resonance velocity $v_x$ and the panning control velocity $v_P$ is higher than or equal to the value of the difference between the highest resonance velocity $v_y$ and the panning control velocity $v_P$, the system control unit 103 transits to step S604. If the system control unit 103 determines that the value of difference between the lowest resonance velocity $v_x$ and the panning control velocity $v_P$ is lower than the value of the difference between the highest resonance velocity $v_y$ and the panning control velocity $v_P$, the system control unit 103 transits to step S605.

In step S604, the system control unit 103 sets the highest resonance velocity $v_y$ as the panning control velocity $v_P$ and transits to step S606.

In step S605, the system control unit 103 sets the lowest resonance velocity $v_x$ as the panning control velocity $v_P$ and transits to step S606.

In step S606, the system control unit 103 calculates the tilting control velocity $v_T$ based on the control velocity parameter acquired in step S301 and the panning control velocity $v_P$. Since a concrete calculation method is the same as step S306, description thereof is omitted. After calculating the tilting control velocity $v_T$, the system control unit 103 transits to step S607.

In step S607, the system control unit 103 determines whether the tilting control velocity $v_T$ calculated in step S606 is included in a range of a resonance velocity (resonance range). If the system control unit 103 determines that the tilting control velocity $v_T$ is included in a range of a resonance velocity (resonance range), the system control unit 103 proceeds to step S608. If the system control unit 103 does not determine that the tilting control velocity $v_T$ is included in a range of a resonance velocity (resonance range), the system control unit 103 proceeds to step S613.

In step S608, the system control unit 103 calculates a value ($v_T - v_x$) of a difference between the lowest velocity (lowest resonance velocity $v_x$) in the range of the resonance velocity and the tilting control velocity $v_T$ and a value ($v_y - v_T$) of a difference between the highest velocity (highest resonance velocity $v_y$) in the range of the resonance velocity and the tilting control velocity $v_T$ and transits to step S609.

In step S609, the system control unit 103 determines whether the value of the difference between the lowest resonance velocity $v_x$ in the resonance range including the tilting control velocity $v_T$ and the tilting control velocity $v_T$ is higher than or equal to the value of the difference between the highest resonance velocity $v_y$ and the tilting control velocity $v_T$, based on the following formula.

$$v_T - v_x \geq v_y - v_T \quad \text{[Math 4]}$$

If the system control unit 103 determines that the value of the difference between the lowest resonance velocity $v_x$ and the tilting control velocity $v_T$ is higher than or equal to the value of the difference between the highest resonance velocity $v_y$ and the tilting control velocity $v_T$, the system control unit 103 transits to step S610. If the system control unit 103 determines that the value of the difference between the lowest resonance velocity $v_x$ and the tilting control velocity $v_T$ is lower than the value of the difference between the highest resonance velocity $v_y$ and the tilting control velocity $v_T$, the system control unit 103 transits to step S611.

In step S610, the system control unit 103 sets the highest resonance velocity $v_y$ as the tilting control velocity $v_T$ and transits to step S612.

In step S611, the system control unit 103 sets the lowest resonance velocity $v_x$ as the tilting control velocity $v_T$ and transits to step S612.

In step S612, the system control unit 103 sets the panning control velocity $v_P$ from the tilting control velocity $v_T$ calculated in step S606 and the tilting control velocity $v_T$ (tilting correction velocity) set in step S610 or S611. The system control unit 103 thus multiplies, by the panning control velocity $v_P$, a ratio between the tilting control velocity $v_T$ calculated based on the control velocity parameter and the tilting correction velocity set based on the resonance velocity parameter. The system control unit 103 sets the multiplication result as the panning control velocity and transits to step S601. Specifically, the system control unit 103 uses the tilting control velocity $v_T$ calculated in step S606 as a tilting control velocity $v_{T1}$ and the tilting control velocity $v_T$ held by the system control unit 103 as a tilting control velocity $v_{T2}$. The panning control velocity $v_{P2}$ is calculated by using the following formula where the panning control velocity $v_P$ held by the system control unit 103 is a panning control velocity $v_{P1}$, the panning control velocity $v_P$ set in step S612 is a panning control velocity $v_{P2}$.

$$v_{P2} = \frac{v_{T2}}{v_{T1}} v_{P1} \quad \text{[Math 5]}$$

In step S613, the system control unit 103 performs control to drive the panning driving unit 106 and the tilting driving unit 108 to the target positions based on the panning control velocity $v_P$ and the tilting control velocity $v_T$ that are held by the system control unit 103 and terminates this flow.

Processing performed in the case where it is not determined in step S304 that the panning driving angle $D_P$ is larger than the tilting driving angle $D_T$ will then be described. Steps S6001 to S6012 are regarded as the same as the calculation method in steps S601 to S612, and description thereof is appropriately omitted.

In step S6001, the system control unit 103 refers to the resonance velocity parameters for the ranges of the resonance velocities (resonance ranges) held by the system control unit 103 and determines whether the tilting control velocity $v_T$ is included in a range of a resonance velocity (resonance range). If the system control unit 103 determines that the tilting control velocity $v_T$ is included in a range of a resonance velocity (resonance ranges), the system control unit 103 transits to step S6002. If the system control unit 103 does not determine that the tilting control velocity $v_T$ is included in a range of a resonance velocity, the system control unit 103 transits to step S6006.

In step S6002, the system control unit 103 calculates a value ($v_T - v_x$) of a difference between the lowest velocity (lowest resonance velocity $v_x$) in the range of the resonance velocity and the tilting control velocity $v_T$ and a value ($v_y - v_T$) of a difference between the highest velocity (highest resonance velocity $v_y$) in the range of the resonance velocity and the tilting control velocity $v_T$ and transits to step S6003.

In step S6003, the system control unit 103 determines whether the value ($v_T - v_x$) of the difference between the lowest velocity (lowest resonance velocity $v_x$) in the range of the resonance velocity and the tilting control velocity $v_T$ is higher than or equal to the value of the difference between the highest velocity (highest resonance velocity $v_y$) in the range of the resonance velocity and the tilting control velocity $v_T$, based on the following formula.

$$v_T - v_x \geq v_y - v_T \quad \text{[Math 6]}$$

If the system control unit 103 determines that the value of the difference between the lowest resonance velocity $v_x$ and the panning control velocity $v_P$ is higher than or equal to the value of the difference between the highest resonance velocity $v_y$ and the tilting control velocity $v_T$, the system control unit 103 transits to step S6004. If the system control unit 103 determines that the value of the difference between the lowest resonance velocity $v_x$ and the tilting control velocity $v_T$ is lower than the value of the difference between the highest resonance velocity $v_y$ and the tilting control velocity $v_T$, the system control unit 103 transits to step S6005.

In step S6004, the system control unit 103 sets the highest resonance velocity $v_y$ as the tilting control velocity $v_T$ and transits to step S6006.

In step S6005, the system control unit 103 sets the lowest resonance velocity $v_x$ as the tilting control velocity $v_T$ and transits to step S6006.

In step S6006, the system control unit 103 calculates the panning control velocity $v_P$ based on the control velocity parameter acquired in step S301 and the tilting control velocity $v_T$. Since a concrete calculation method is the same as step S306, description thereof is omitted. After calculating the panning control velocity $v_P$, the system control unit 103 transits to step S6007.

In step S6007, the system control unit 103 determines whether the panning control velocity $v_P$ calculated in step S6006 is included in a range of a resonance velocity (resonance range). If the system control unit 103 determines that the panning control velocity $v_P$ is included in a range of a resonance velocity (resonance range), the system control unit 103 proceeds to step S6008. If the system control unit 103 does not determine that the panning control velocity $v_P$ is included in a range of a resonance velocity (resonance range), the system control unit 103 proceeds to step S613.

In step S6008, the system control unit 103 calculates a value ($v_P - v_x$) of a difference between the lowest velocity (lowest resonance velocity $v_x$) in the range of the resonance velocity and the panning control velocity $v_P$ and a value ($v_y - v_P$) of a difference between the highest velocity (highest resonance velocity $v_y$) in the range of the resonance velocity and the panning control velocity $v_P$ and transits to step S6009.

In step S6009, the system control unit 103 determines whether the value of the difference between the lowest resonance velocity $v_x$ in the resonance range including the panning control velocity $v_P$ and the panning control velocity $v_P$ is higher than or equal to the value of the difference between the highest resonance velocity $v_y$ and the panning control velocity $v_P$, based on the following formula.

$$v_P - v_x \geq v_y - v_P \quad \text{[Math 7]}$$

If the system control unit 103 determines that the value of the difference between the lowest resonance velocity $v_x$ and the panning control velocity $v_P$ is higher than or equal to the value of the difference between the highest resonance velocity $v_y$ and the panning control velocity $v_P$, the system control unit 103 transits to step S610. If the system control unit 103 determines that the value of the difference between the lowest resonance velocity $v_x$ and the panning control velocity $v_P$ is lower than the value of the difference between the highest resonance velocity $v_y$ and the panning control velocity $v_P$, the system control unit 103 transits to step S6011.

In step S6010, the system control unit 103 sets the highest resonance velocity $v_y$ as the panning control velocity $v_P$ and transits to step S6012.

In step S6011, the system control unit 103 sets the lowest resonance velocity $v_x$ as the panning control velocity $v_P$ and transits to step S6012.

In step S6012, the system control unit 103 sets the tilting control velocity $v_T$ from the panning control velocity $v_P$ calculated in step S6006 and the panning control velocity $v_P$ (panning correction velocity) set in step S6010 or S6011. The system control unit 103 thus multiplies, by the tilting control velocity $v_T$, a ratio between the panning control velocity $v_P$ calculated based on the control velocity parameter and the panning correction velocity set based on the resonance velocity parameter. The system control unit 103 sets the multiplication result as the tilting control velocity $v_T$ and transits to step S6001. Since the calculation method is the same as instep S612, concrete description thereof is omitted.

As described above, according to this embodiment, the vibration due to resonance may be inhibited by avoiding the velocity leading to the resonance in the preset move operation. Further, panning and tilting control velocities causing the panning and tilting driving units to simultaneously reach the target positions may be calculated.

The functions of the embodiment described above can be implemented by the following configuration. That is, the functions are achieved in such a manner that program code for the processing of this embodiment is provided to a system or an apparatus and is run by a computer (or a CPU or a MPU) of the system or the apparatus. In this case, the program code itself read from a storage medium implements the functions of the embodiment described above, and the storage medium storing the program code also implements the functions of this embodiment.

The program code for implementing the functions of this embodiment may be run by one computer (or a CPU or a MPU) or may be run by a plurality of computers in cooperation with each other. Further, the one or more computers may run the program code, or hardware such as a circuit for implementing the functions of the program code may also be provided. Alternatively, part of the program code may be implemented by hardware and the remaining part thereof may be run by the one or more computers.

Second Embodiment

In the first embodiment, the system control unit 103 avoids the velocity leading to the resonance in starting the preset move operation. The process for calculating the panning control velocity $v_P$ and the tilting control velocity $v_T$ has been described, the calculation being performed to match the panning driving time for driving the panning driving unit 106 in the pan direction by the panning driving angle $D_P$ with the tilting driving time for driving the tilting driving unit 108 in the tilt direction by the tilting driving angle $D_T$.

In this embodiment, an example where the system control unit 103 drives the lens driving unit 104 in addition to the panning driving unit 106 and the tilting driving unit 108. To drive the panning driving unit 106, the tilting driving unit 108, and the lens driving unit 104 to simultaneously reach the target positions, each control velocity is calculated to set the panning and tilting control velocities outside a range of a resonance velocity and to match driving time for each of the panning driving unit 106, the tilting driving unit 108, and the lens driving unit 104.

A control velocity calculation process in starting a preset move operation will be described by using flowcharts in FIGS. 7A and 7B.

In this flowchart, the OS, various programs, and various pieces of data are loaded into a RAM (storage device) that temporarily stores computer programs to be run by the system control unit 103, and the system control unit 103 executes this process. Steps in the flowcharts in FIGS. 7A and 7B are performed for the system control unit 103 to perform a preset move operation based on the control command 2200 indicating the preset move operation after receiving the control command 2200 from the external apparatus 200 via the communication interface. A screen for setting a control velocity parameter for the panning and tilting control velocities is displayed on the display unit 205, and the user sets the control velocity parameter with the user interface unit 201. The control velocity parameter for the panning and tilting control velocities thus set is transmitted to the communication interface unit 110.

Figure 7A:
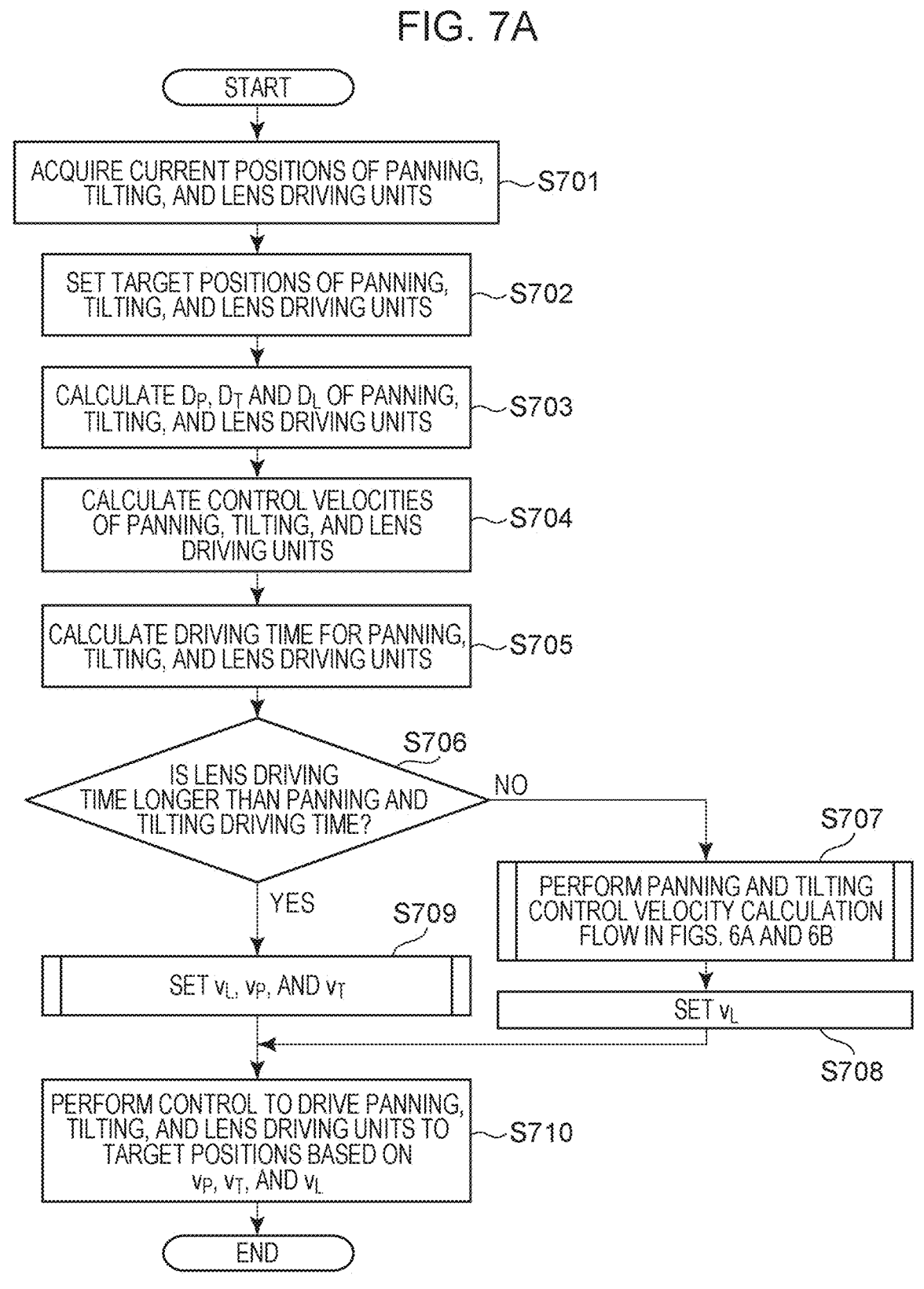
Figure 7B:
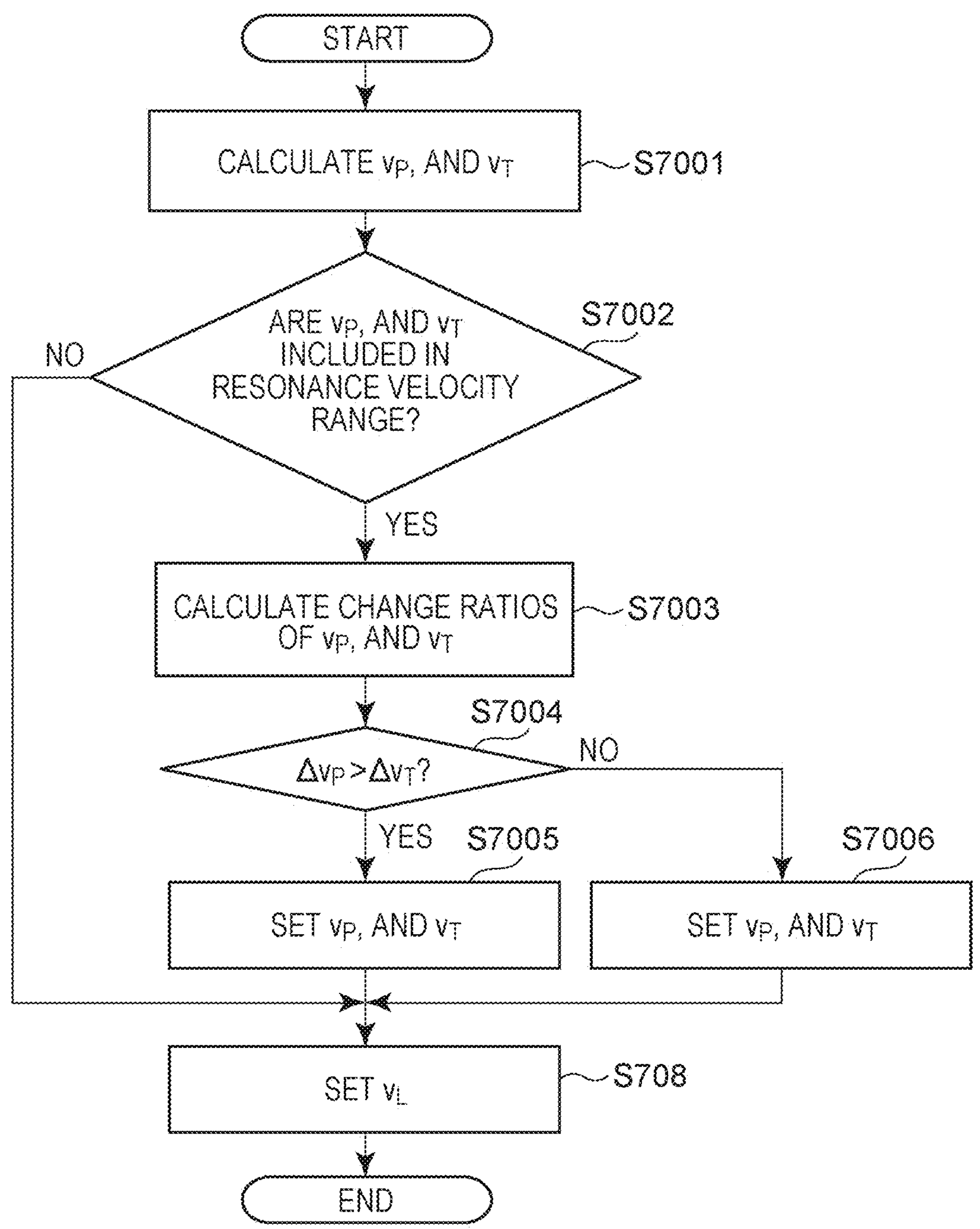
FIG. 7B is a flowchart illustrating a process for calculating panning, tilting, and lens control velocities performed if the lens driving time is longer than the panning driving time and the tilting driving time.

FIG. 7A illustrates a control velocity calculation flow according to this embodiment, and FIG. 7B illustrates a calculation flow specifically describing step S709.

In step S701, the system control unit 103 acquires the current position of the panning driving unit 106 from the panning control unit 107, the current position of the tilting driving unit 108 from the tilting control unit 109, and the current position of the lens driving unit 104 from the lens control unit 105. Further, the system control unit 103 acquires a preset number designated with the control command 2200 and a control velocity parameter.

The system control unit 103 thereafter transits to step S702.

In step S702, the system control unit 103 sets the panning, tilting, and lens positions with the preset number held by the system control unit 103 as the target positions based on the preset number acquired in step S301 and transits to step S703.

In step S703, the system control unit 103 calculates the panning driving angle $D_P$, the tilting driving angle $D_T$, and a lens driving distance DL based on the current positions of the panning driving unit 106, the tilting driving unit 108, and the lens driving unit 104 and the target positions of the panning driving unit 106, the tilting driving unit 108, and the lens driving unit 104 that are set in step S302.

In this embodiment, the lens driving distance DL (m) denotes a distance (m) at the time when a lens serving as the reference is driven inside the lens barrel from the current position to the target position but is not limited to this. Any value enabling the driving time for driving from the current position to the target position to be calculated in step S704 (described later) may be used. For example, a zoom-in value representing zoom magnification may be converted as a lens position, and the driving time may be calculated from the zoom-in value.

In step S704, the system control unit 103 calculates driving time taken for each of the panning driving unit 106, the tilting driving unit 108, and the lens driving unit 104 to reach a corresponding one of the target positions if the panning driving unit 106, the tilting driving unit 108, and the lens driving unit 104 are driven with a control velocity parameter therefor. Since a method for calculating a control velocity is the same method as step S305, description thereof is omitted.

In step S705, the system control unit 103 calculates lens driving time, panning control time, and tilting control time from a lens control velocity $v_L$, the panning control velocity $v_P$ and the tilting control velocity $v_T$, and the target positions of the driving units. The driving time for the driving units can be calculated by the same method as step S306.

In step S706, the system control unit 103 determines whether the lens driving time is longer than the panning driving time and the tilting driving time, based on the driving time for the panning driving unit 106, the driving time for the tilting driving unit 108, and the driving time for the lens driving unit 104 that are calculated in step S705. If the system control unit 103 does not determine that the lens driving time is longer, the system control unit 103 proceeds to step S707. If the system control unit 103 determines that the lens driving time is longer, the system control unit 103 proceeds to step S709.

In step S707, the system control unit 103 sets the panning control velocity $V_P$ and the tilting control velocity $V_T$ in accordance with the flowcharts in FIGS. 6A and 6B and proceeds to step S708.

In step S708, the system control unit 103 sets the lens control velocity $v_L$ of the lens driving unit 104 to cause the lens driving unit 104, the panning driving unit 106, and the tilting driving unit 108 to simultaneously reach the target positions in driving the panning driving unit 106 and the tilting driving unit 108 at the panning control velocity $V_P$ and the tilting control velocity $V_T$ that are thus set and proceeds to step S710.

At this time, panning control time $T_P$ and tilting control time $T_T$ that are used to calculate the lens control velocity $v_L$ are identical, and thus any of these may be used. For example, when calculating the by using the panning control time $T_P$, the system control unit 103 may calculate the lens control velocity $v_L$ as below.

$$v_L = \frac{v_P}{T_p} T_L \quad \text{[Math 8]}$$

That is, the system control unit 103 calculates the lens control velocity $v_L$ to cause the lens driving unit 104 to reach the target position in the same driving time as the driving time for the panning driving unit 106 and the driving time for the tilting driving unit 108 that are calculated in step S707.

In step S709, the system control unit 103 calculates the respective control velocities $v_P$, $v_T$, and $v_L$ of the panning driving unit 106, the tilting driving unit 108, and the lens driving unit 104 to avoid the inclusion of each of the control velocities $v_P$ and $v_T$ of the panning driving unit 106 and the tilting driving unit 108 in a range of a resonance velocity and also cause the panning driving unit 106, the tilting driving unit 108, and the lens driving unit 104 to simultaneously reach the target positions and simultaneously stop at the target positions. First, the system control unit 103 calculates the panning and tilting control velocities $v_P$ and $v_T$ to cause each of the panning control velocity $v_P$ and the tilting control velocity $v_T$ to be outside the corresponding range of the resonance velocity. The system control unit 103 then calculates a change ratio of the panning and tilting control velocities $v_P$ and $v_T$ and sets the panning control velocity $v_P$ and the tilting control velocity $v_T$ to cause the panning driving time and the tilting driving time to be identical. Further, the system control unit 103 calculates the lens control velocity $v_L$ to cause the panning driving time, the tilting driving time, and the driving time for the lens driving unit to be identical and transits to step S710. A concrete calculation method will be described with reference to FIG. 7B.

In step S710, the system control unit 103 moves the panning driving unit 106, the tilting driving unit 108, and the lens driving unit 104 to the target positions at the panning control velocity $v_P$, the tilting control velocity $v_T$, and the lens control velocity $v_L$ that are thus set.

As described above, according to this embodiment, the vibration due to resonance may be inhibited by avoiding the velocity leading to the resonance in the preset move operation performed when the system control unit 103 drives the panning driving unit 106, the tilting driving unit 108, and the lens driving unit 104. Further, such panning, tilting, and lens control velocities $v_P$, $v_T$, and $v_L$ that cause the panning driving unit 106, the tilting driving unit 108, and the lens driving unit 104 to simultaneously reach the target positions may be calculated.

A process in which the panning, tilting, and lens control velocities $v_P$, $v_T$, and $v_L$ are calculated if the lens driving time for the lens driving unit 104 is longer than the panning driving time and the tilting driving time will be described with reference to FIG. 7B.

In step S7001, the system control unit 103 calculates the panning and tilting control velocities $v_P$ and $v_T$ to cause the lens driving time, the panning driving time, the tilting driving time to be identical when the lens driving unit is driven at the lens control velocity $V_L$ calculated in step S704. For example, the panning control velocity $v_P$ is calculated as below.

$$v_P = \frac{D_P}{D_L} v_L \quad \text{[Math 9]}$$

In step S7002, the system control unit 103 determines whether the panning control velocity $v_P$ and the tilting control velocity $v_T$ that are calculated in step S7001 are included in a range of a resonance velocity.

In step S7003, the system control unit 103 calculates a change ratio between the panning control velocity $v_P$ and the tilting control velocity $v_T$ that are calculated in step S704 and the panning control velocity $v_P$ and the tilting control velocity $v_T$ that are calculated in step S7001. A change ratio $\Delta v_P$ of the panning control velocity $v_P$ can be calculated by using the following formula where the panning control velocity $v_P$ calculated in step S704 is $v_{P1}$, and the panning control velocity $v_P$ calculated in step S7001 is $v_{P2}$.

$$\Delta v_P = \frac{v_{P2} - v_{P1}}{v_{P1}} \quad \text{[Math 10]}$$

In step S7004, the system control unit 103 determines whether the change ratio $\Delta v_P$ of the panning control velocity $v_P$ is higher than a change ratio $\Delta v_T$ of the tilting control velocity $v_T$. If the system control unit 103 determines that the change ratio $\Delta v_P$ of the panning control velocity $v_P$ is higher than the change ratio $\Delta v_T$ of the tilting control velocity $v_T$, the system control unit 103 transits to step S7005. If the system control unit 103 does not determine that the change ratio $\Delta v_P$ of the panning control velocity $v_P$ is higher than the change ratio $\Delta v_T$ of the tilting control velocity $v_T$, the system control unit 103 transits to step S7006.

In step S7005, the system control unit 103 sets the panning control velocity $v_P$ and the tilting control velocity $v_T$. The system control unit 103 calculates a difference between the panning control velocity $v_P$ and the lowest resonance velocity $v_x$ and a difference between the panning control velocity $v_P$ and the highest resonance velocity $v_y$ (S602). The system control unit 103 then determines whether a value of the difference between the lowest velocity (lowest resonance velocity $v_x$) in the resonance velocity range including the panning control velocity $v_P$ and the panning control velocity $v_P$ is higher than or equal to a value of the difference between the highest velocity (highest resonance velocity $v_y$) in the resonance velocity range and the panning control velocity $v_P$ (S602). The system control unit 103 sets the lowest resonance velocity $v_x$ or the highest resonance velocity $v_y$ as the panning control velocity $v_P$ (S604 or S605). The system control unit 103 then calculates the tilting control velocity $v_T$ (S606). The system control unit 103 determines whether the tilting control velocity $v_T$ is included in a range of a resonance velocity (S607). If the system control unit 103 determines that the tilting control velocity $v_T$ is included in a range of a resonance velocity, the system control unit 103 sets the lowest resonance velocity $v_x$ or the highest resonance velocity $v_y$ as the tilting control velocity $v_T$ (S610 or S611). If the system control unit 103 does not determine that the tilting control velocity $v_T$ is included in a range of a resonance velocity, the system control unit 103 transits to step S710. The system control unit 103 also corrects the panning control velocity $v_P$ based on the correction of the tilting control velocity $v_T$ (S612) and repeats steps S601 to S612 until the panning control velocity $v_P$ and the tilting control velocity $v_T$ are outside the range of the resonance velocity.

In step S7006, the system control unit 103 sets the panning control velocity $v_P$ and the tilting control velocity $v_T$. The system control unit 103 calculates the difference between the tilting control velocity $v_T$ and the lowest resonance velocity $v_x$ and the difference between the tilting control velocity $v_T$ and the highest resonance velocity $v_y$ (S6002). The system control unit 103 then determines whether a value of the difference between the lowest velocity (lowest resonance velocity $v_x$) in the resonance velocity range including the tilting control velocity $v_T$ and the tilting control velocity $v_T$ is higher than or equal to a value of the difference between the highest velocity (highest resonance velocity $v_y$) in the resonance velocity range and the tilting control velocity $v_T$ (S6003). The system control unit 103 sets the lowest resonance velocity $v_x$ or the highest resonance velocity $v_y$ as the tilting control velocity $v_T$ (S6004 or S6005). The system control unit 103 then calculates the panning control velocity $v_P$ (S6006).

The system control unit 103 determines whether the panning control velocity $v_P$ is included in a range of a resonance velocity (S6007). If the system control unit 103 determines that the panning control velocity $v_P$ is included in a range of a resonance velocity, the system control unit 103 sets the lowest resonance velocity $v_x$ or the highest resonance velocity $v_y$ as the panning control velocity $v_P$ (S6010 or S6011). If the system control unit 103 does not determine that the panning control velocity $v_P$ is included in a range of a resonance velocity, the system control unit 103 transits to step S710. corrects the tilting control velocity $v_T$ based on the correction of the panning control velocity $v_P$ (S6012) and repeats steps S6001 to S6012 until the panning control velocity $v_P$ and the tilting control velocity $v_T$ are outside the range of the resonance velocity.

As described above, according to this embodiment, the vibration due to resonance may thereby be inhibited by avoiding the velocity leading to the resonance in the preset move operation performed when the system control unit 103 drives the panning driving unit 106, the tilting driving unit 108, and the lens driving unit 104. Further, such panning, tilting, and lens control velocities $v_P$, $v_T$, and $v_L$ that cause the panning driving unit 106, the tilting driving unit 108, and the lens driving unit 104 to simultaneously reach the target positions may be calculated.

Third Embodiment

In the first embodiment, the system control unit 103 avoids the velocity leading to the resonance in starting the preset move operation. The process for calculating the panning control velocity $v_P$ and the tilting control velocity $v_T$ has also been described, the calculation being performed to match the panning driving time for driving the panning driving unit 106 in the pan direction by the panning driving angle $D_P$ with the tilting driving time for driving the tilting driving unit 108 in the tilt direction by the tilting driving angle $D_T$ has also been described.

In this embodiment, driving time for the panning and the tilting may further be set, and the panning and tilting control velocities $v_P$ and $v_T$ are calculated in accordance with the driving time.

Figure 8A:
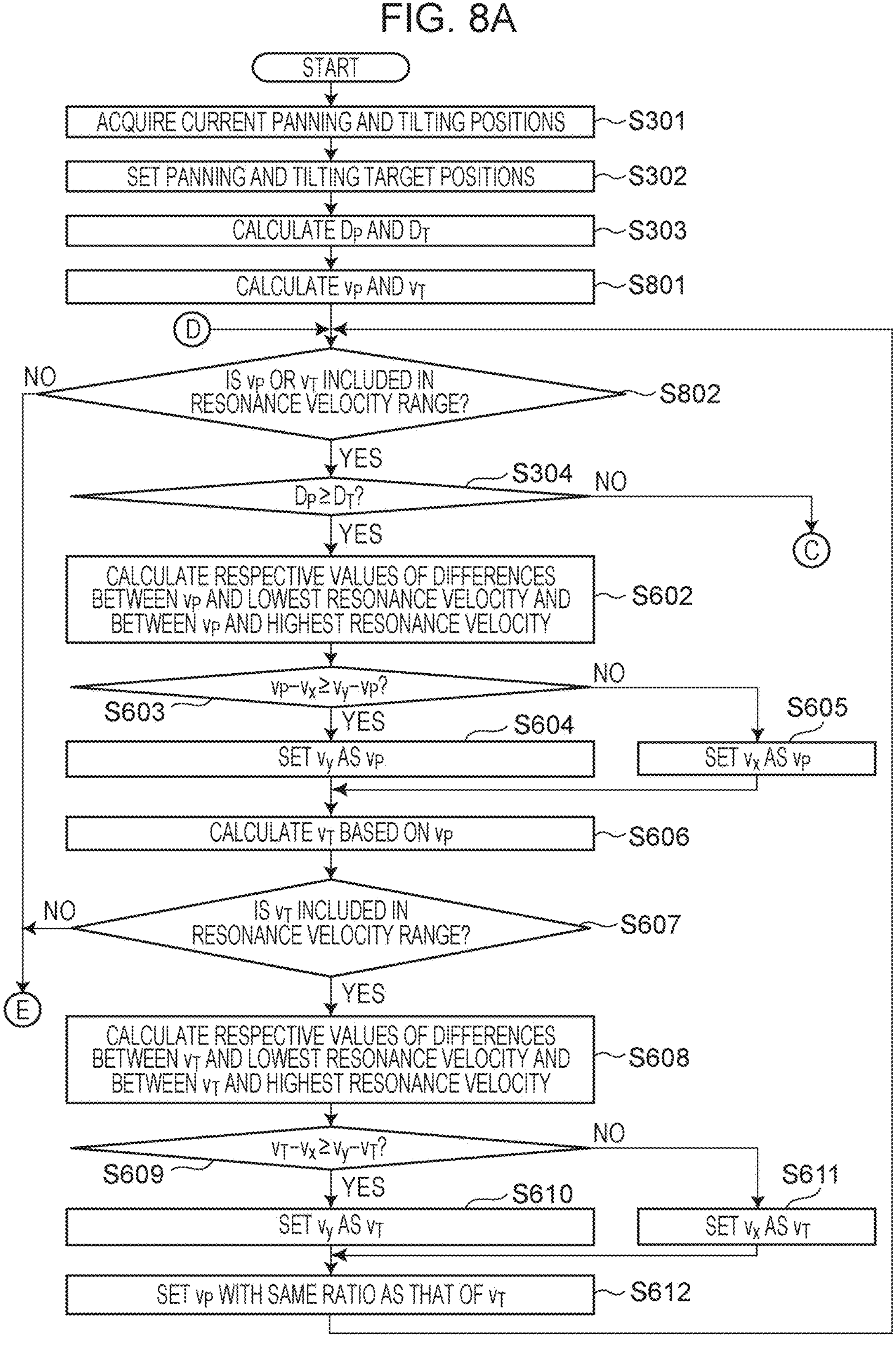
FIGS. 8A and 8B are flowcharts illustrating a control velocity calculation process according to one or more aspects of the present disclosure in the preset move operation.
Figure 8B:
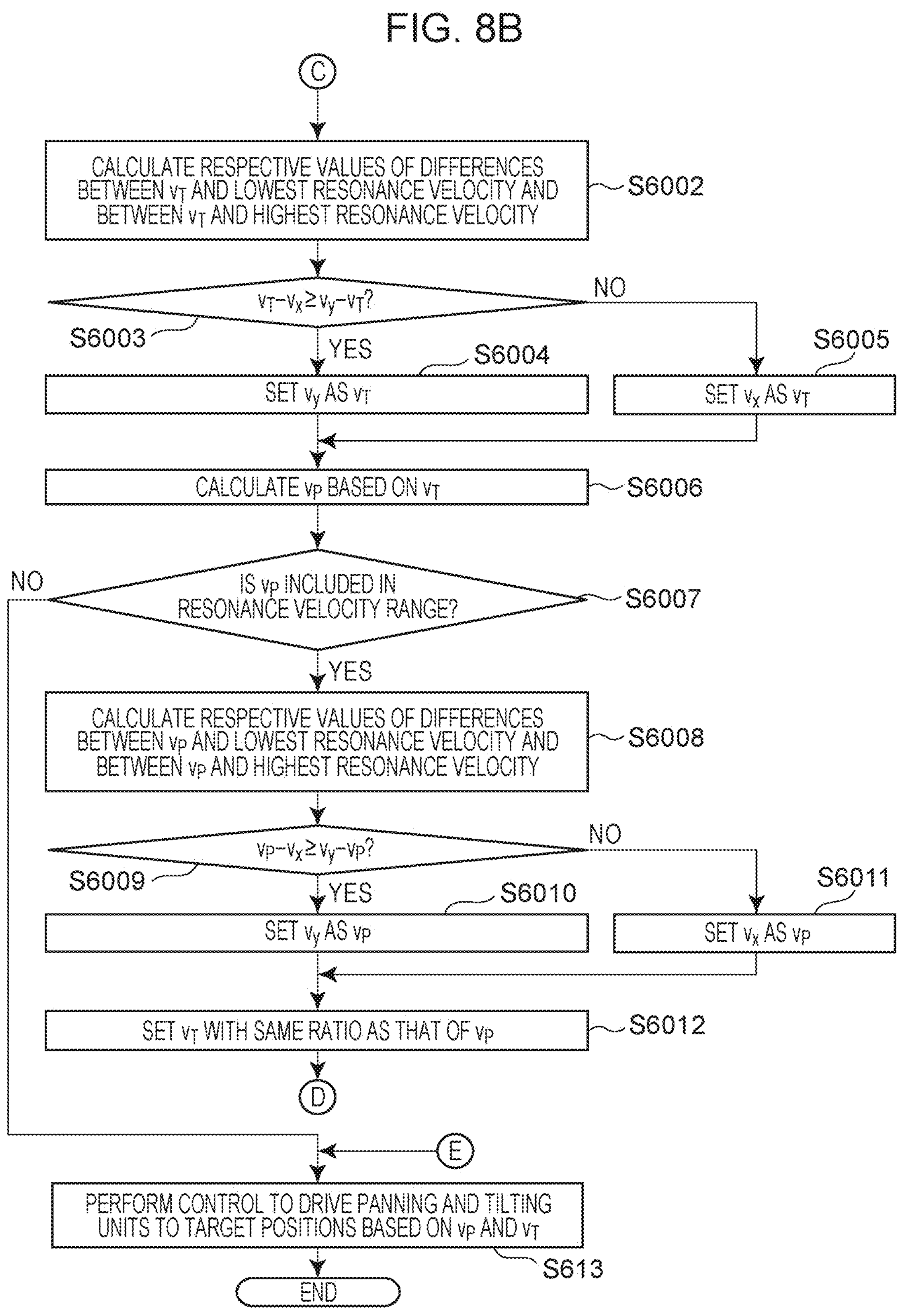

In this flowcharts, the OS, various programs, and various pieces of data are loaded into a RAM (storage device) that temporarily stores computer programs to be run by the system control unit 103, and the system control unit 103 executes this process. The flowcharts in FIGS. 8A and 8B are performed when the system control unit 103 receives a control command indicating a preset move operation from the external apparatus 200 via the communication interface and causes the preset move operation to be performed based on the control command. A screen for setting a control velocity parameter for the panning and tilting control velocities is displayed on the display unit 205, and the user sets the control velocity parameter with the user interface unit 201. The control velocity parameter for the panning and tilting control velocities thus set is transmitted to the communication interface unit 110. Further, in this embodiment, the driving time may be set with the control velocity parameter.

Since steps S601 to S613 and steps S6001 to S6012 described above are the same as those in this embodiment, description thereof is omitted.

In step S801, the system control unit 103 calculates the panning control velocity $v_P$ based on the current position and the panning target position of the panning driving unit 106 and the driving time set with the control velocity parameter. Further, the system control unit 103 calculates the tilting control velocity $v_T$ based on the current positions and the tilting target positions of the tilting driving unit 108 and the driving time set with the control velocity parameter. That is, the system control unit 103 calculates the panning control velocity $v_P$ and the tilting control velocity $v_T$ based on the current positions of the panning driving unit 106 and the tilting driving unit 108 that are acquired in step S301, the panning and tilting target positions set in step S302, and the driving time.

In step S802, the system control unit 103 determines whether at least one of the panning control velocity $v_P$ or the tilting control velocity $v_T$ calculated in step S801 is included in a range of a resonance velocity. If the system control unit 103 determines that at least one of the panning control velocity $v_P$ or the tilting control velocity $v_T$ is included in a range of a resonance velocity, the system control unit 103 transits to step S304. If the system control unit 103 does not determine that at least one of the panning control velocity $v_P$ or the tilting control velocity $v_T$ is included in a range of a resonance velocity, the system control unit 103 transits to step S613.

As described above, according to this embodiment, the vibration due to resonance may be inhibited by avoiding the velocity leading to the resonance in the preset move operation performed when the system control unit 103 drives the panning driving unit 106 and the tilting driving unit 108. Further, such panning and tilting control velocities $v_P$ and $v_T$ that cause the panning driving unit 106 and the tilting driving unit 108 to simultaneously reach the target position in driving time as close as possible to the driving time set by the user may be calculated.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-037019, filed Mar. 11, 2024, which is hereby incorporated by reference herein in its entirety.

What is claimed is:

1. A control device that performs control of a panning driving unit and a tilting driving unit, the panning driving unit changing an image capturing direction of an image capturing unit to a pan direction, the tilting driving unit changing the image capturing direction to a tilt direction, the control device comprising:

a calculating unit that calculates a panning control velocity and a tilting control velocity to cause, to be identical, driving time for driving the panning driving unit to a panning target position and driving time for driving the tilting driving unit to a tilting target position; and a control unit that performs control to drive the panning driving unit at the panning control velocity and that performs control to drive the tilting driving unit at the tilting control velocity, wherein if at least one of the calculated panning control velocity or the calculated tilting control velocity is included in a range of a specified velocity specified based on mechanical resonance of the image capturing unit, the calculating unit corrects the panning control velocity and the tilting control velocity to cause, to be identical, the driving time for driving the panning driving unit to the panning target position and the driving time for driving the tilting driving unit to the tilting target position.

2. The control device according to claim 1, wherein the calculating unit calculates the panning control velocity and the tilting control velocity based on a predetermined velocity parameter.

3. The control device according to claim 2, wherein if a driving angle to the tilting target position of the tilting driving unit is larger than or equal to a driving angle to the panning target position of the panning driving unit, and if a determination unit makes a determination that the panning control velocity is included in the range of the specified velocity, the calculating unit calculates the tilting control velocity based on a ratio between the panning control velocity and a panning correction velocity obtained by correcting the panning control velocity, and wherein if the driving angle to the tilting target position of the tilting driving unit is smaller than the driving angle to the panning target position of the panning driving unit, and if a determination unit makes a determination that the tilting control velocity is included in the range of the specified velocity, the calculating unit calculates the panning control velocity based on a ratio between the tilting control velocity and a tilting correction velocity obtained by correcting the tilting control velocity.

4. The control device according to claim 3, wherein the image capturing unit further includes a lens driving unit that drives a lens, wherein the calculating unit calculates the panning control velocity, the tilting control velocity, and a lens control velocity to cause, to be identical, the driving time for driving the panning driving unit to the panning target position, the driving time for driving the tilting driving unit to the tilting target position, and driving time for driving the lens driving unit to a lens target position, and wherein if a correction unit corrects at least one of the panning control velocity or the tilting control velocity, the calculating unit calculates the lens control velocity based on the ratio between the panning control velocity and the panning correction velocity or the ratio between the tilting control velocity and the tilting correction velocity.

5. The control device according to claim 2, wherein the velocity parameter further includes information regarding the driving time for driving the panning driving unit to the panning target position or the driving time for driving the tilting driving unit to the tilting target position.

6. The control device according to claim 1, wherein the control unit further includes a determination unit that makes a determination of whether one of the panning control velocity and the tilting control velocity is included in the range of the specified velocity, and wherein if the determination unit makes a determination that one of the panning control velocity and the tilting control velocity is included in the range of the specified velocity, the correction unit corrects at least one of the panning control velocity or the tilting control velocity based on the determination of the determination unit.

7. The control device according to claim 1, wherein the image capturing unit further includes a lens driving unit that drives a lens, wherein the calculating unit calculates the panning control velocity, the tilting control velocity, and a lens control velocity to cause, to be identical, the driving time for driving the panning driving unit to the panning target position, the driving time for driving the tilting driving unit to the tilting target position, and driving time for driving the lens driving unit to a lens target position.

8. A control method for performing control of a panning driving unit and a tilting driving unit, the panning driving unit changing an image capturing direction of an image capturing unit to a pan direction, the tilting driving unit changing the image capturing direction to a tilt direction, the method comprising:

calculating a panning control velocity and a tilting control velocity to cause, to be identical, driving time for driving the panning driving unit to a panning target position and driving time for driving the tilting driving unit to a tilting target position; and performing control to drive the panning driving unit at the panning control velocity and performing control to drive the tilting driving unit at the tilting control velocity, wherein in the calculating, if at least one of the calculated panning control velocity or the calculated tilting control velocity is included in a range of a specified velocity specified based on mechanical resonance of the image capturing unit, correcting the panning control velocity and the tilting control velocity to cause, to be identical, the driving time for driving the panning driving unit to the panning target position and the driving time for driving the tilting driving unit to the tilting target position.

9. A non-transitory computer readable medium storing an instruction causing a computer to execute a control method for performing control of a panning driving unit and a tilting driving unit, the panning driving unit changing an image capturing direction of an image capturing unit to a pan direction, the tilting driving unit changing the image capturing direction to a tilt direction, the method comprising:

calculating a panning control velocity and a tilting control velocity to cause, to be identical, driving time for driving the panning driving unit to a panning target position and driving time for driving the tilting driving unit to a tilting target position; and performing control to drive the panning driving unit at the panning control velocity and performing control to drive the tilting driving unit at the tilting control velocity, wherein in the calculating, if at least one of the calculated panning control velocity or the calculated tilting control velocity is included in a range of a specified velocity specified based on mechanical resonance of the image capturing unit, correcting the panning control velocity and the tilting control velocity to cause, to be identical, the driving time for driving the panning driving unit to the panning target position and the driving time for driving the tilting driving unit to the tilting target position.

* * * * *